United States Patent
Niwa et al.

(10) Patent No.: US 12,443,307 B2
(45) Date of Patent: Oct. 14, 2025

(54) TOUCH SENSOR

(71) Applicant: Panasonic Intellectual Property Management Co., Ltd., Kadoma (JP)

(72) Inventors: Hiromitsu Niwa, Gifu Ken (JP); Takafumi Adachi, Gifu Ken (JP); Mitsuru Satou, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/834,027

(22) PCT Filed: Jan. 23, 2023

(86) PCT No.: PCT/JP2023/001855
§ 371 (c)(1),
(2) Date: Jul. 29, 2024

(87) PCT Pub. No.: WO2023/145673
PCT Pub. Date: Aug. 3, 2023

(65) Prior Publication Data
US 2025/0147617 A1 May 8, 2025

(30) Foreign Application Priority Data
Jan. 31, 2022 (JP) ................. 2022-013151

(51) Int. Cl.
*G06F 3/041* (2006.01)
*H05K 1/18* (2006.01)

(52) U.S. Cl.
CPC ......... *G06F 3/04164* (2019.05); *H05K 1/189* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 2014/0177176 A1 | 6/2014 | Torii et al. | |
| 2017/0123570 A1* | 5/2017 | Maruyama | G06F 3/044 |
| 2018/0145278 A1 | 5/2018 | Zhai | |
| 2021/0048923 A1 | 2/2021 | Niwa et al. | |

FOREIGN PATENT DOCUMENTS

| | | |
|---|---|---|
| JP | 2009-020272 A | 1/2009 |
| JP | 6146998 B2 | 6/2017 |
| JP | 2019-175064 A | 10/2019 |
| WO | 2019/211931 A1 | 11/2019 |

OTHER PUBLICATIONS

International Search Report dated Mar. 28, 2023, issued in counterpart International Application No. PCT/JP2023/001855 (5 pages).

* cited by examiner

*Primary Examiner* — Krishna P Neupane
(74) *Attorney, Agent, or Firm* — WHDA, LLP (57) ABSTRACT

A flexible wiring board includes an insulating board, a ground layer, and at least one first lightning arrester electrically connected to the ground layer. The first lightning arrester extends from the ground layer to a contour end of the insulating board positioned near a connection area. The first lightning arrester is configured so that one end is positioned at the contour end of the insulating board near the connection area.

5 Claims, 9 Drawing Sheets

TOUCH SENSOR

CROSS REFERENCE TO RELATED APPLICATIONS

This Application is the National Stage of International Application No. PCT/JP2023/001855, filed on Jan. 23, 2023, which claims priority from Application No. 2022-013151 filed on Jan. 31, 2022 in Japan. The entire contents of these applications are incorporated herein by reference in their entirety.

TECHNICAL FIELD

The present disclosure relates to a touch sensor.

BACKGROUND ART

A touch sensor, such as one disclosed in Patent Document 1, has been typically known. Patent Document 1 discloses a touch sensor including a sensor board and a flexible wiring board (circuit board) connected to the sensor board.

The flexible wiring board of Patent Document 1 includes signal line parts, a ground part electrically insulated from the signal line parts, and an insulating layer covering the ground part. A plurality of through holes that expose the ground part are formed in the insulating layer. In each of the through holes, an electroconductive material is stacked on the upper side of the ground part.

CITATION LIST

Patent Document

Patent Document 1: PCT International Publication No. WO 2019/211931

SUMMARY OF THE INVENTION

Technical Problem

The plurality of through holes are each arranged near an area where the insulating layer is connected to the sensor board, but at a position away from a contour end of the insulating layer. Therefore, for example, if static electricity is generated near the area and near the contour end of the insulating layer, the static electricity is not guided to the conductive layer positioned in each through hole. Therefore, the static electricity may not be eliminated from the ground part. To address this, there has been a need for a further improvement for the flexible wiring board, to avoid effects of static electricity.

In view of the foregoing background, it is an object of the present invention to avoid effects of static electricity.

Solution to the Problem

To achieve the object, a touch sensor according to an embodiment of the present disclosure includes a sensor board and a flexible wiring board connected to the sensor board. The flexible wiring board includes: at least one insulative and flexible insulating board; a ground layer connectable to a ground potential, which is arranged on at least one surface of the insulating board, at a position excluding a connection area between the sensor board and the insulating board; and at least one first lightning arrester electrically connected to the ground layer, which is arranged on at least one surface of the insulating board. The first lightning arrester extends from the ground layer to a contour end of the insulating board positioned near a connection area. The first lightning arrester is configured so that one end is positioned at the contour end of the insulating board near the connection area.

Advantages of the Invention

According to the present disclosure, the effects of static electricity can be avoided.

DESCRIPTION OF EMBODIMENTS

Embodiments of the present disclosure will be described in detail below with reference to the drawings. The following description of the embodiments is merely exemplary in nature and is not intended to limit the present disclosure, its application, or its uses.

Figure 1:
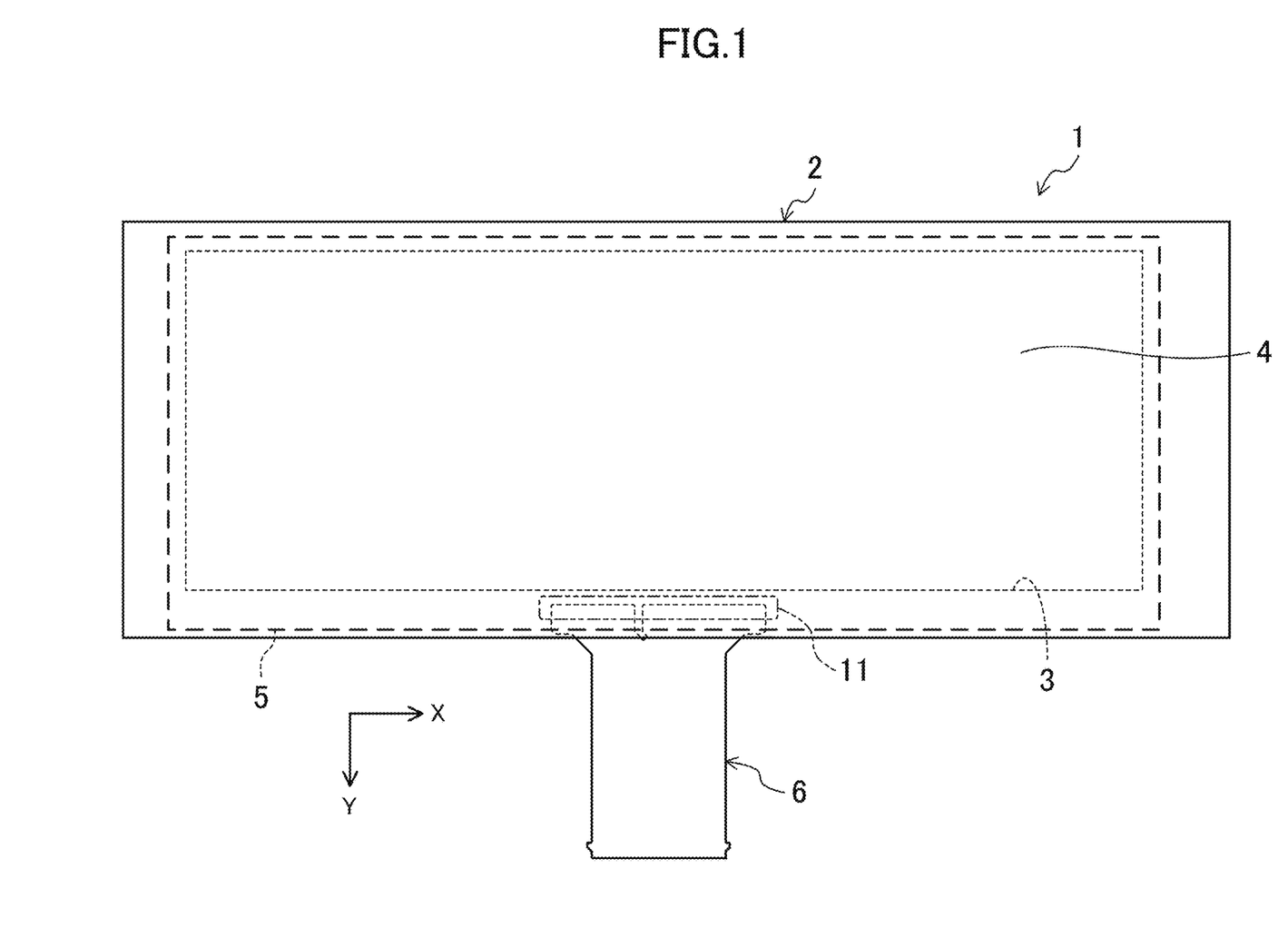
FIG. 1 is a plan view showing an overall touch sensor according to a first embodiment.

FIG. 1 shows an overall configuration of a touch sensor 1 of a first embodiment of the present disclosure. The touch sensor 1 is a capacitive sensing input device applied to a display device (not shown), such as a liquid crystal display. The touch sensor 1 is used as an input device for, for example, an in-vehicle device such as a car navigation system, a display device of a personal computer, a mobile phone, a portable information terminal, a portable game machine, a copying machine, a ticket vending machine, an automatic teller machine, or a clock.

In the following description, an operation screen 4, which will be described later, is located on an "upper side" of the touch sensor 1 (the visible side of the touch sensor 1), whereas the opposite side is referred to as a "lower side" of the touch sensor 1. With these terms, the positional relationships between the elements configuring the touch sensor 1 will be defined.

Further, a positional relationship between the touch sensor 1 and each of later-described elements in the touch sensor 1 is specified based on an X direction and a Y direction shown in the drawings. The X direction is defined as a direction parallel to the longitudinal direction of a later-described sensor board 5 shown in FIG. 1. The Y direction is defined as a direction parallel to the transverse direction of the sensor board 5 (a direction orthogonal to the X direction). Such a positional relationship is irrelevant to the actual direction in the touch sensor 1.

(Cover Member)

As shown in FIG. 1, the touch sensor 1 includes a light-transmissive cover member 2. The cover member 2 is a cover lens made of, for example, cover glass or plastic. The cover member 2 is in the shape of a rectangular plate, for example, in a plan view.

On the peripheral edge of the lower surface of the cover member 2, a fringe 3 substantially in a frame shape is formed in a dark color such as black by screen printing, for example. An internal rectangular area surrounded by the fringe 3 serves as a light-transmittable view area. That is, through the view area, the user can obtain visual information from the display device arranged on the lower side of the touch sensor 1. The upper surface of the cover member 2 corresponding to the view area serves as an operation screen 4 to be touched by a user's finger, for example, in a touch operation.

(Sensor Board)

As shown in FIG. 1, the touch sensor 1 includes the sensor board 5. The sensor board 5 has a substantially rectangular shape in a plan view. The sensor board 5 is attached to the back surface of the cover member 2 by an adhesive layer (not shown). The adhesive layer is made of, for example, an optical clear adhesive (OCA).

The material of the sensor board 5 can be a light-transmissive resin material such as acrylic (PMMA), polyethylene terephthalate (PET), polycarbonate (PC), cyclo-olefin polymer (COP), cyclo-olefin copolymer (COC), epoxy, and the like, silicone, or glass.

The sensor board 5 has a plurality of capacitive sensor electrodes (not shown). The plurality of sensor electrodes are each arranged on the sensor board 5 at a position corresponding to the view area. This enables the touch sensor 1 to detect touch operation by a user's finger (detection target) in contact with the operation screen 4.

The plurality of sensor electrodes include a plurality of transmission electrodes (not shown) and a plurality of reception electrodes (not shown). The transmission electrodes are connected to a drive circuit (not shown) via a flexible wiring board 6 described later. This drive circuit allows each transmission electrode to radiate an electric field to the vicinity. The reception electrodes are connected to a detector circuit (not shown) via the flexible wiring board 6 described later. The reception electrodes receive the electric fields radiated from the transmission electrodes.

(Flexible Wiring Board)

As shown in FIG. 1, the touch sensor 1 includes a flexible wiring board 6. The flexible wiring board 6 is connected to the sensor board 5. The flexible wiring board 6 has flexibility and electrical characteristics that are unchanged even in a state of deformation.

(Insulating Board)

Figure 2:
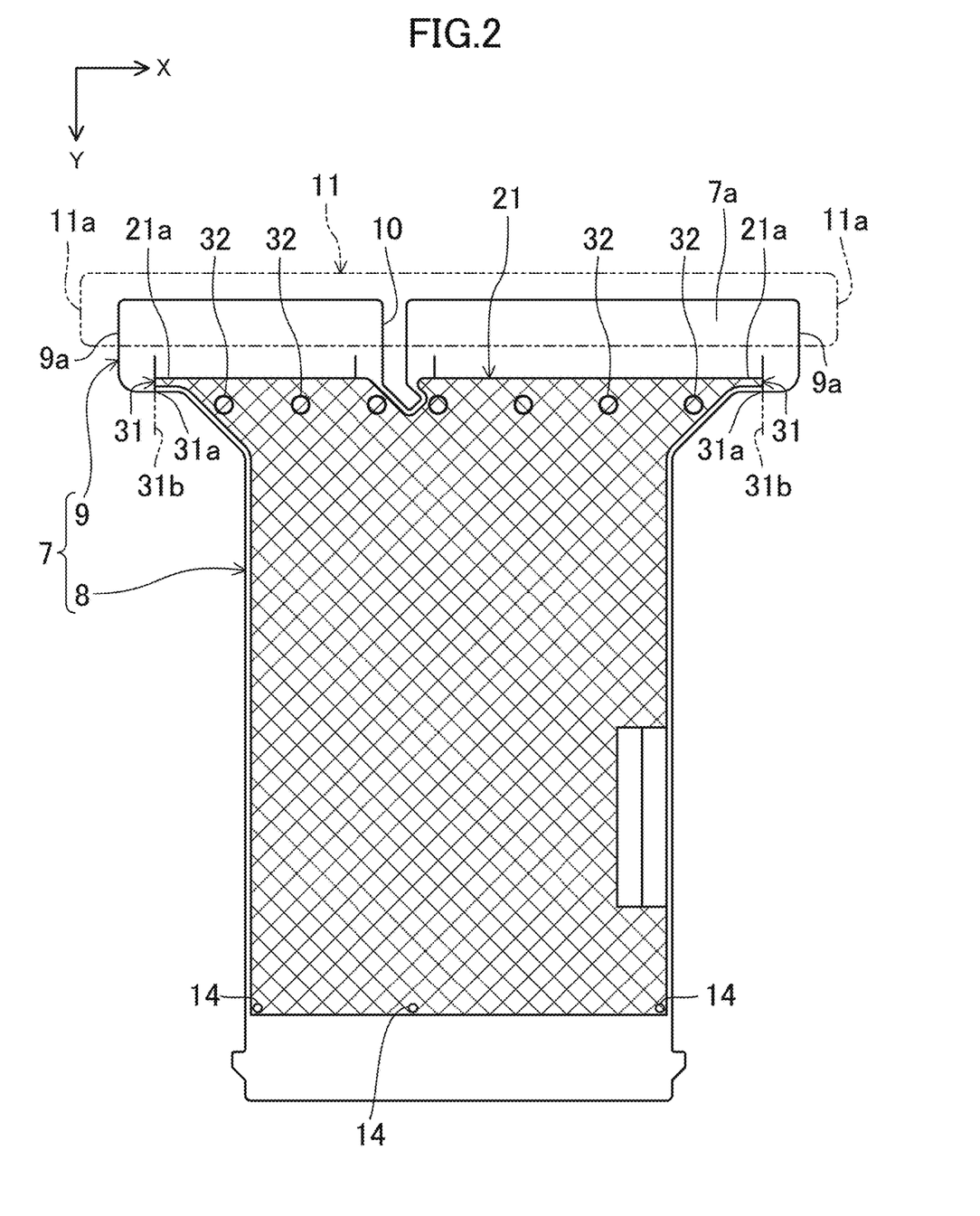
FIG. 2 is a view schematically showing a configuration of a first surface side of a flexible wiring board in the first embodiment.
Figure 3:
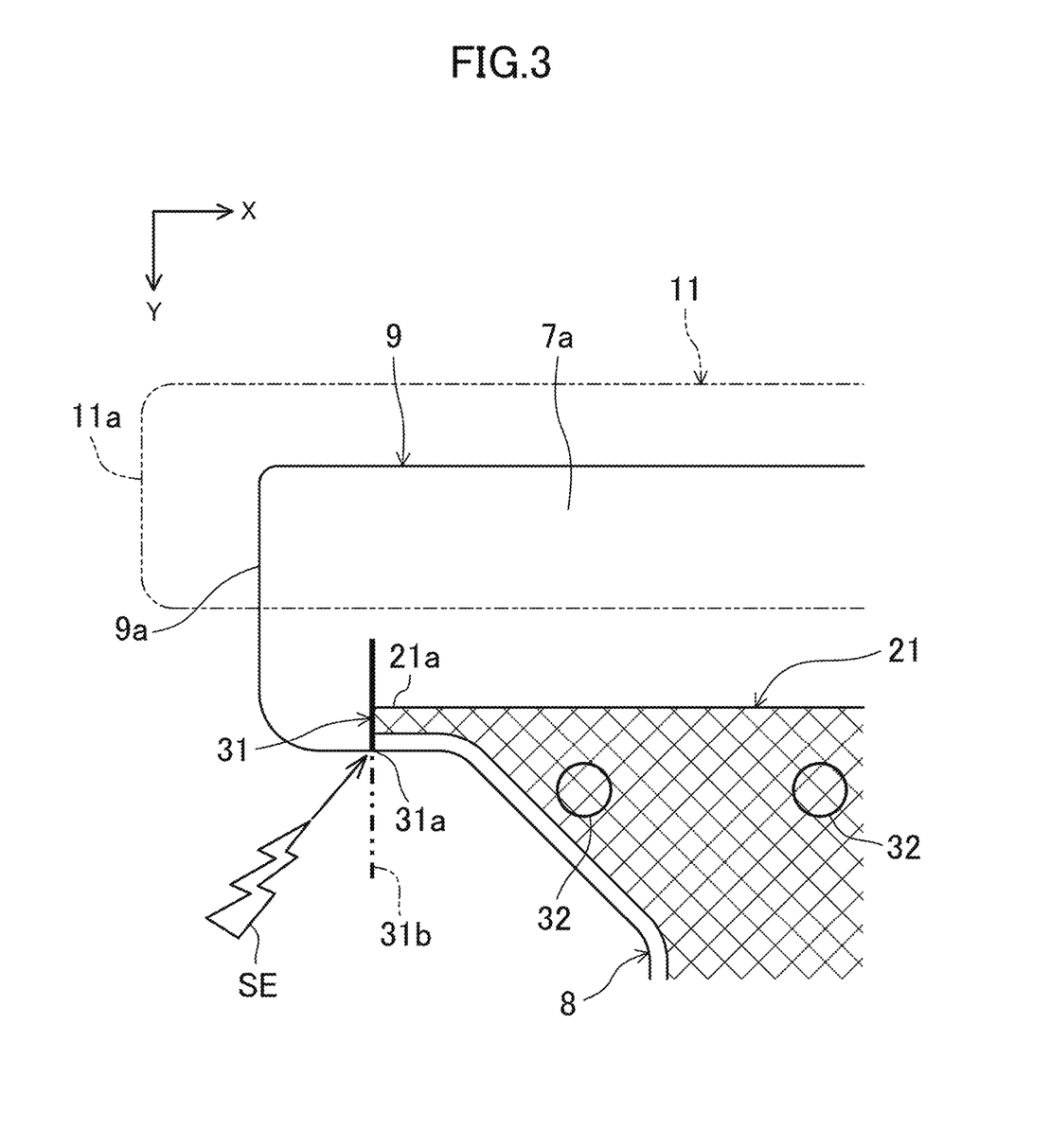
FIG. 3 is a partially enlarged view showing a configuration near a connection area in FIG. 2.
Figure 4:
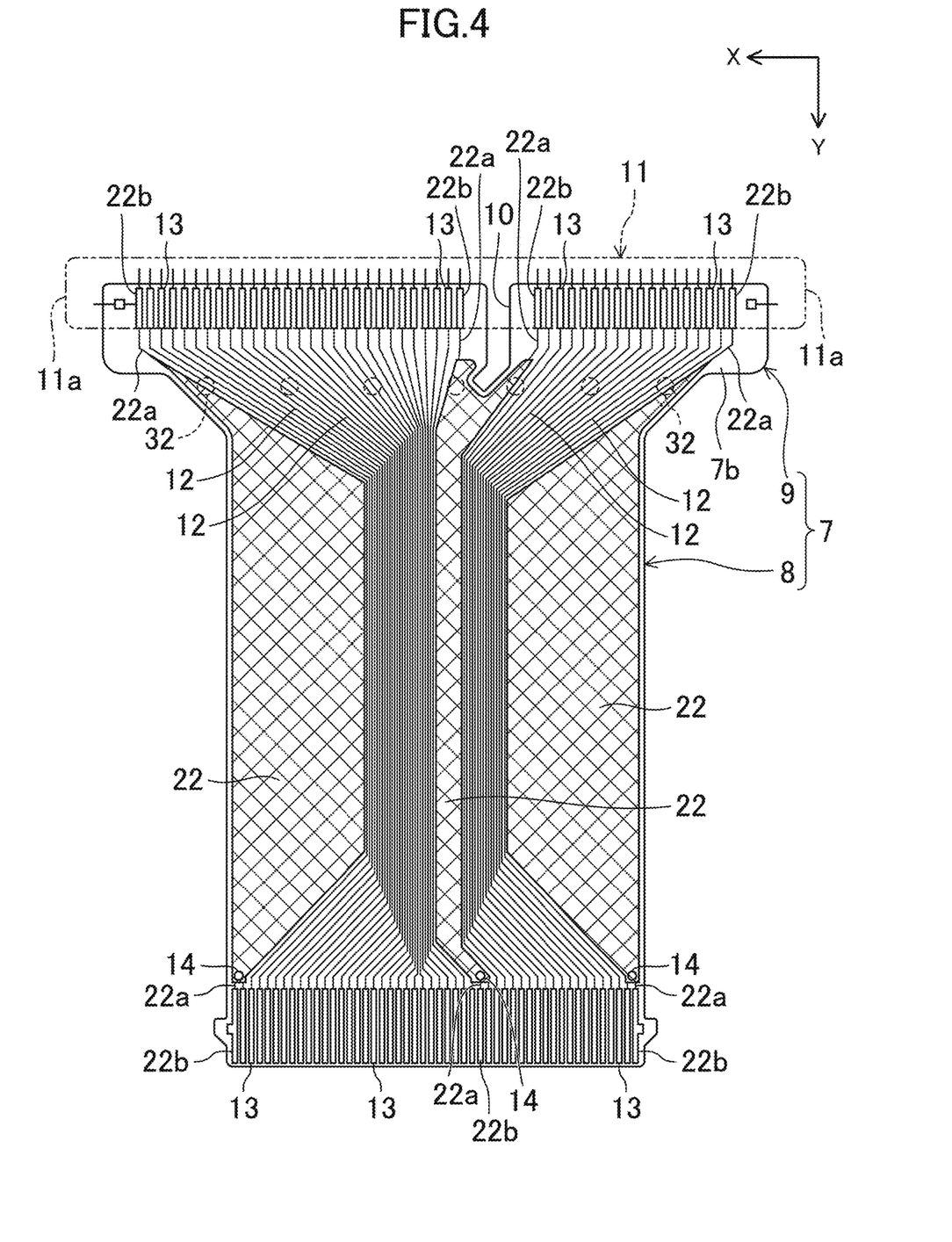
FIG. 4 is a view schematically showing a configuration of a second surface side of the flexible wiring board in the first embodiment.

As shown in FIG. 2 to FIG. 4, the flexible wiring board 6 includes an insulating board 7. The insulating board 7 is insulative and flexible. The insulating board 7 is made of, for example, an insulation film sheet having flexibility. Polyimide (PI), polyethylene terephthalate (PET), polyethylene naphthalate (PEN), and the like are suitable as materials for insulation film sheet.

The insulating board 7 has a first surface 7a and a second surface 7b. The first surface 7a is arranged so that it faces the side (upper side) where the cover member 2 is positioned.

The second surface 7b is arranged so that it faces the opposite side (lower side) of the side where the cover member 2 is positioned.

The insulating board 7 has a substantially T-shaped outer shape in a plan view. The insulating board 7 has a body 8 and a connection part 9. The body 8 and the connection part 9 are integral. The connection part 9 is configured to have a width in the X direction greater than the width of the body 8. The connection part 9 is configured such that each end 9a thereof in the longitudinal direction (X direction) is positioned near each end 11a of a connection area 11 described later.

A cutout 10 is formed in the connection part 9. The cutout 10 is cut out in the Y direction, from a position in a long side (an X directional side) of the connection part 9. This cutout 10 divides the connection part 9 into two areas in the X direction.

The connection part 9 is connected to a peripheral edge of the sensor board 5. Specifically, the connection part 9 is fixed to a peripheral edge of the sensor board 5 (a long side portion of the sensor board 5, on the lower side of the paper of FIG. 1) by, for example, an anisotropic conductive adhesive. In FIG. 1 to FIG. 4, the area surrounded by the virtual line (reference character 11) is schematically shown as the area where the connection part 9 is connected to the peripheral edge of the sensor board 5 (hereinafter referred to as the "connection area").

(Signal Line)

As shown in FIG. 4, the flexible wiring board 6 includes a plurality of signal lines 12. The plurality of signal lines 12 are arranged on the second surface 7b of the insulating board 7. Each of the signal lines 12 is made of an electroconductive material such as copper. Each signal line 12 extends from the connection part 9 to the body 8. The plurality of signal lines 12 are arranged and spaced from one another so as not to overlap on another in the width direction (X direction) of the body 8. At both ends of each signal line 12, there are signal terminals 13 connected to the connection terminals (not shown) of the sensor board 5 and to external devices.

(Ground Layer)

The flexible wiring board 6 includes a ground layer. The ground layer of this embodiment includes a first ground layer 21 (see FIG. 2) and a plurality of second ground layers 22 (see FIG. 4). The ground layer is connected to a ground potential. The ground layer is electrically insulated from the plurality of signal lines 12. The ground layer is made of an electroconductive material such as copper. The ground layer is formed on the first surface 7a and the second surface 7b of the insulating board 7 by, for example, etching.

The ground layer is arranged at a position other than a connection area 11 in the insulating board 7. Specifically, the ground layer is arranged at a position away from the connection area 11 in the Y direction.

As shown in FIG. 2 and FIG. 3, the first ground layer 21 is arranged on the first surface 7a of the insulating board 7. The first ground layer 21 has narrow portions 21a and 21a. The narrow portions 21a and 21a are arranged on both ends of the ground layer 21 in the X direction. Specifically, each narrow portion 21a is arranged near the end 9a of the connection part 9 in the longitudinal direction (X direction).

As shown in FIG. 4, the plurality of second ground layers 22 are arranged on the second surface 7b of the insulating board 7. The plurality of second ground layers 22 are arranged in an area of the second surface 7b of the insulating board 7, in which area the plurality of signal lines 12 are not positioned.

Signal terminals 22a and 22a are provided at both ends of each second ground layer 22. Each signal line 22a is arranged with an interval from the plurality of signal lines 12. Each signal line 22a is provided with signal terminals 22b and 22b. Each signal terminal 22b is arranged with an interval from the plurality of signal terminals 13 in the X direction. The signal terminals 22b positioned closer to the connection part 9 are electrically connected to ground connection terminals (not shown) provided on the sensor board 5. On the other hand, the signal terminals 22b positioned on the lower side of the paper of FIG. 4 is connected to an external device.

As shown in FIG. 2 and FIG. 4, the body 8 is provided with a plurality of (three in the illustrated example) through holes 14. Each of the through holes 14 is an element that electrically connects the first ground layer 21 and the second ground layer 22. The plurality of through holes 14 are arranged and spaced from one another in the width direction (X direction) of the body 8. The plurality of through holes 14 are positioned near the plurality of signal terminals 13 of the body 8 (on the lower side of the paper of FIG. 2 and FIG. 4), relative to the Y direction.

A cover film (not shown) is provided closer to the first surface 7a of the insulating board 7 (upper surface side of the first ground layer 21). Another cover film (not shown) is also provided closer to the second surface 7b of the insulating board 7 (the lower surface side of the second ground layer 22 and the lower side of the plurality of signal lines 12).

(First Lightning Arrester)

As shown in FIG. 2 and FIG. 3, the flexible wiring board 6 includes a plurality of (two in the illustrated example) first lightning arresters 31. The plurality of first lightning arresters 31 are made of an electroconductive material such as copper, similar to the ground layer.

In this embodiment, the plurality of first lightning arresters 31 are arranged only on one surface of the insulating board 7. Specifically, the first lightning arresters 31 are arranged on the first surface 7a of the insulating board 7.

The plurality of first lightning arresters 31 are arranged and spaced from one another in the longitudinal direction (X direction) of the connection area 11. Each of the first lightning arresters 31 is arranged near the end 11a of the connection area 11, in the longitudinal direction (X direction). Specifically, each of the first lightning arresters 31 is arranged near the end 9a of the connection part 9. Further, each of the first lightning arresters 31 is positioned closer to the end 11a of the connection area 11 as compared to the second lightning arresters 32 (described later) in the X direction.

Each of the first lightning arresters 31 is formed in a linear shape. Each of the first lightning arresters 31 and the first ground layer 21 are integral. Specifically, each first lightning arrester 31 is integral with the narrow portion 21a of the first ground layer 21. Thus, each first lightning arrester 31 is electrically connected to the first ground layer 21.

Each first lightning arrester 31 extends from the first ground layer 21 to the contour end of the insulating board 7, near the connection area 11. Specifically, each first lightning arrester 31 extends from each narrow portion 21a of the first ground layer 21 to the contour end of the connection part 9 and extends in the Y direction.

As a characteristic configuration of the present disclosure, each of the first lightning arresters 31 is configured so that one end 31a is positioned at the contour end of the insulating board 7, near the connection area 11. Specifically, the end 31a of each first lightning arrester 31 is positioned at the contour end of the connection part 9, which is away from the connection area 11 in the Y direction. That is, the end 31a of each first lightning arrester 31 is arranged so as not to overlap the connection area 11.

An overview of a method for manufacturing a flexible wiring board 6 is described below. First, at least a plurality of signal lines 12, a ground layer, and a plurality of first lightning arresters 31 are formed in advance on a base material (not shown) before an insulating board 7 is processed into a specified shape. Next, the base material is machined (cut or punched, and the like). As a result, an insulating board 7 having a predetermined shape as illustrated in FIG. 2 is obtained. In this process, an excess material 31b (see FIG. 2 and FIG. 3) of each first lightning arrester 31 formed in advance on the base material is removed by machining. This way, the ends 31a of the first lightning arresters 31 are arranged at the contour end of the insulating board 7.

(Second Lightning Arrester)

As shown in FIG. 2, the flexible wiring board 6 includes a plurality of second lightning arresters 32. The plurality of second lightning arresters 32 are arranged near the connection area 11.

The plurality of second lightning arresters 32 are arranged on the first surface 7a. The plurality of second lightning arresters 32 positioned on the first surface 7a are composed of the electroconductive material stacked and arranged on the upper surface of the first ground layer 21. An exemplary suitable material of the plurality of second lightning arresters 32 is an electroconductive material containing gold (Au).

Each of the second lightning arresters 32 is arranged at a position where the cover film is partially opened in a circular shape. Each second lightning arrester 32 is configured so that the electroconductive material containing gold (Au) for example, is exposed from the circular opening. The shape of the opening is not limited to a circular shape, and may be another shape (for example, a triangular shape or a quadrangular shape).

The plurality of second lightning arresters 32 are arranged and spaced from one another in the longitudinal direction (X direction) of the connection area 11. The second lightning arrester 32 positioned near the end 11a of the connection area 11 is arranged with an interval from the first lightning arresters 31 in the X direction.

Advantages of First Embodiment

As described above, the flexible wiring board 6 includes at least one first lightning arrester 31. This facilitates, for example, the flow of static electricity generated near the contour end of the insulating board 7 close to the connection area 11 (see reference character SE in FIG. 3) into each of the first lightning arresters 31 positioned at the contour end of the insulating board 7. That is, the static electricity is guided to the end 31a of each first lightning arrester 31 near the sensor board 5. The static electricity flowing into the end 31a of each first lightning arresters 31 is eliminated by the ground layer connected to ground potential. As a result, the flow of the static electricity to the sensor board 5 and a mounting board of a display device (not shown) is blocked. This way, malfunctions of the touch sensor 1 and display device caused by static electricity are avoided. Therefore, in the touch sensor 1 of the first embodiment, the effects of static electricity can be avoided.

In this embodiment, two first lightning arresters 31 are arranged and spaced from each other in the longitudinal direction of the connection area 11. This facilitates the flow of the static electricity into the end 31a of at least one first lightning arrester 31 in the longitudinal direction of the connection area 11. As a result, the effects of static electricity can be efficiently avoided.

Each of the first lightning arresters 31 is arranged near the end 11a of the connection area 11, in the longitudinal direction. This facilitates the flow of the static electricity into the end 31a of the first lightning arrester 31, which is positioned near the end 11a. As a result, the effects of static electricity can be reliably avoided.

Each of the first lightning arresters 31 and each of the second lightning arresters 32 are arranged near the connection area 11 and are spaced from one another in the longitudinal direction of the connection area 11. Thus, the static electricity flows toward either the first lightning arresters 31 or the second lightning arresters 32. As a result, the effects of static electricity can be more reliably avoided.

In this embodiment, each of the first lightning arresters 31 is positioned closer to the end 11a of the connection area 11 in the longitudinal direction (X direction) as compared to the second lightning arresters 32. This facilitates the flow of the static electricity into each first lightning arrester 31 positioned near the end 11a of the connection area 11, even when the static electricity is generated near each end 11a of the connection area 11, for example. As a result, the effects of static electricity can be more reliably avoided.

Variations of First Embodiment

Figure 5:
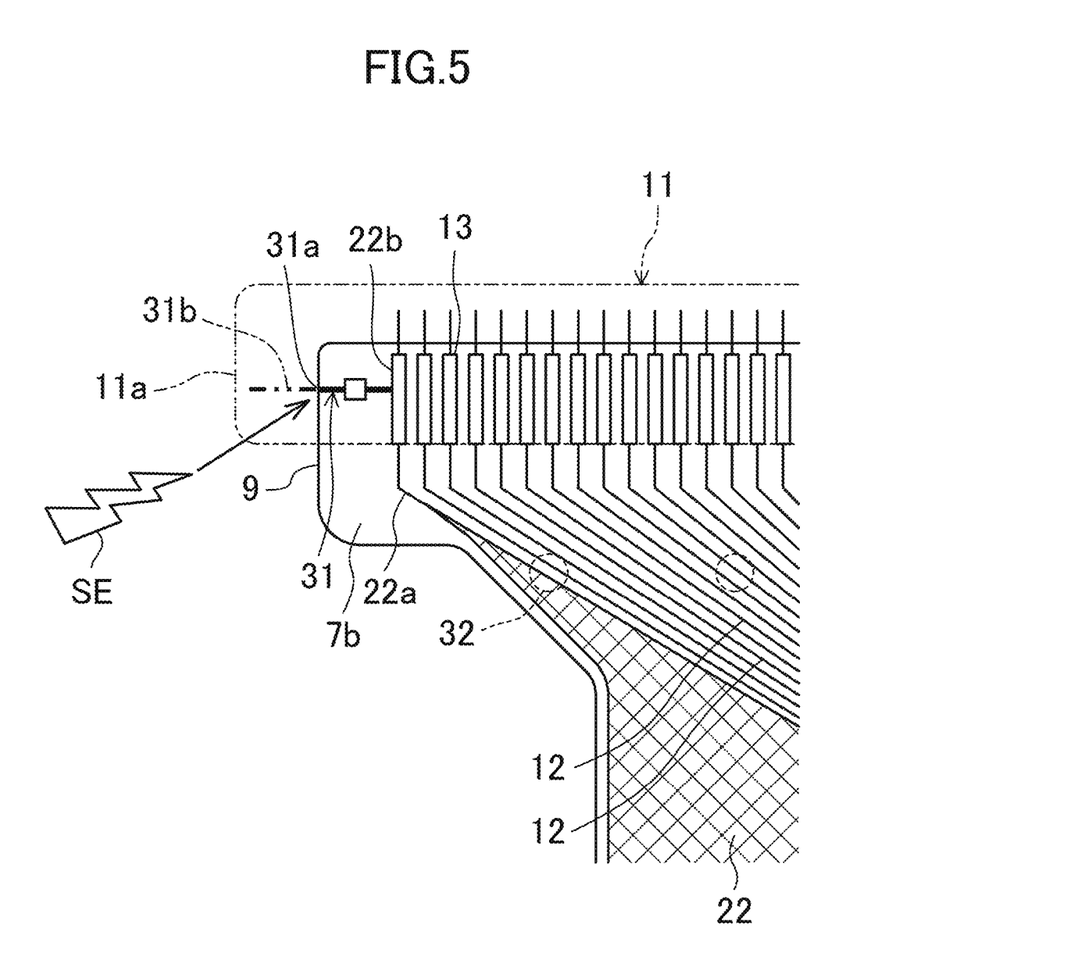
FIG. 5 is a partially enlarged view showing a configuration of a second surface side of a flexible wiring board in a variation of the first embodiment.

In the first embodiment, the plurality of first lightning arresters 31 are arranged only on the first surface 7a of the insulating board 7. The configuration, however, is not limited to this. For example, as in a variation shown in FIG. 5, the first lightning arresters 31 can also be arranged on the second surface 7b. In this variation, the first lightning arresters 31 are connected to the signal terminals 22b positioned closer to the connection part 9. That is, the first lightning arresters 31 of this variation is electrically connected to the second ground layer 22. Even in such a variation, the effects of static electricity can be avoided, as in the above embodiment.

Second Embodiment

FIG. 6 to FIG. 9 show a flexible wiring board 6 of the second embodiment. In this embodiment, the configuration of the flexible wiring board 6 is different from the flexible wiring board 6 shown in the first embodiment. In the flexible wiring board 6 of the second embodiment, the same reference characters are given to configurations identical to those in FIG. 1 to FIG. 4, and the detailed description thereof will be omitted. In the second embodiment, the configuration of the cover member 2 and sensor board 5 is the same as that described in the first embodiment, and therefore the illustrations of the cover member 2 and sensor board 5 are omitted in the second embodiment.

(Insulating Board)

Figure 6:
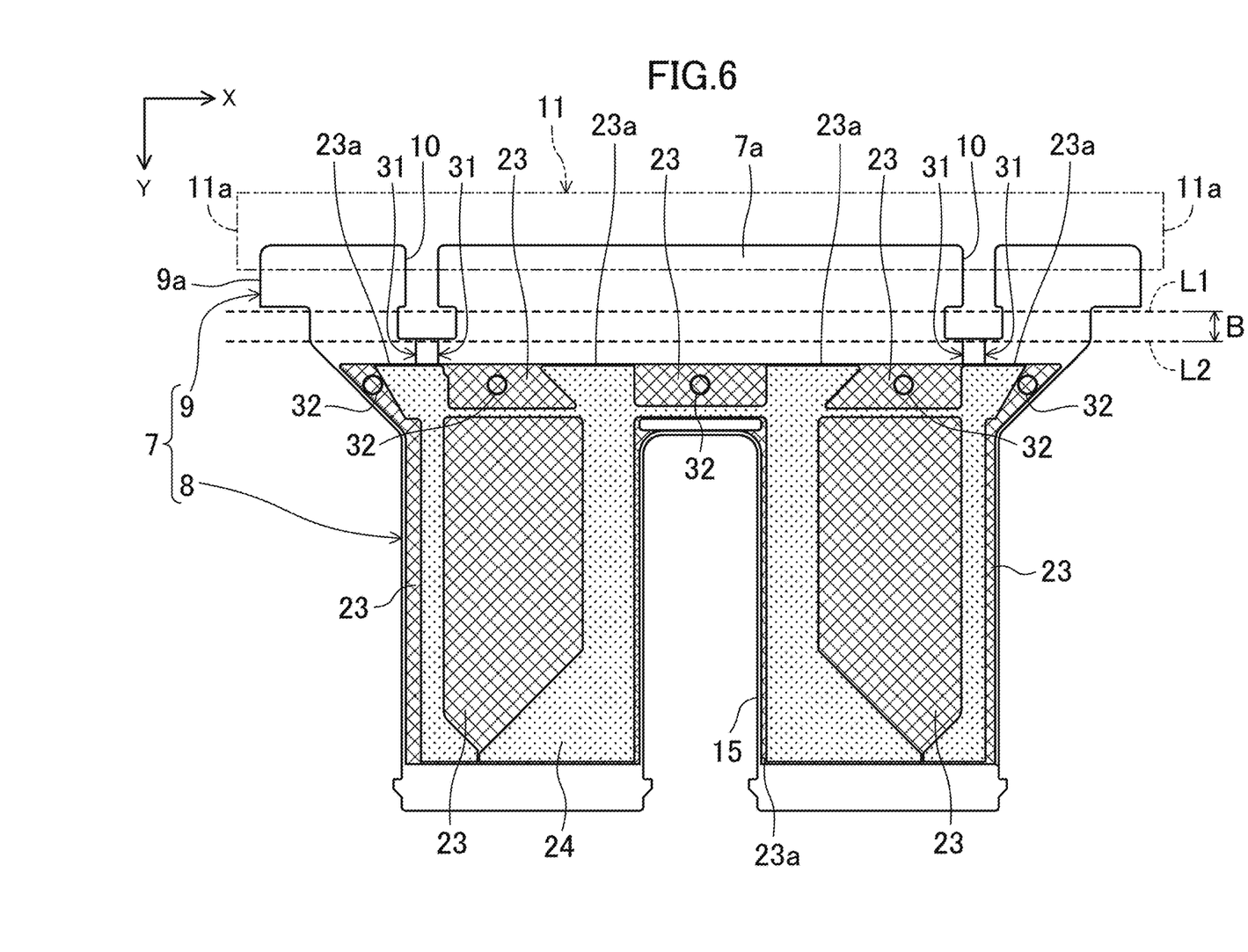
FIG. 6 is a view schematically showing a configuration of a first surface side of a flexible wiring board in a second embodiment.
Figure 8:
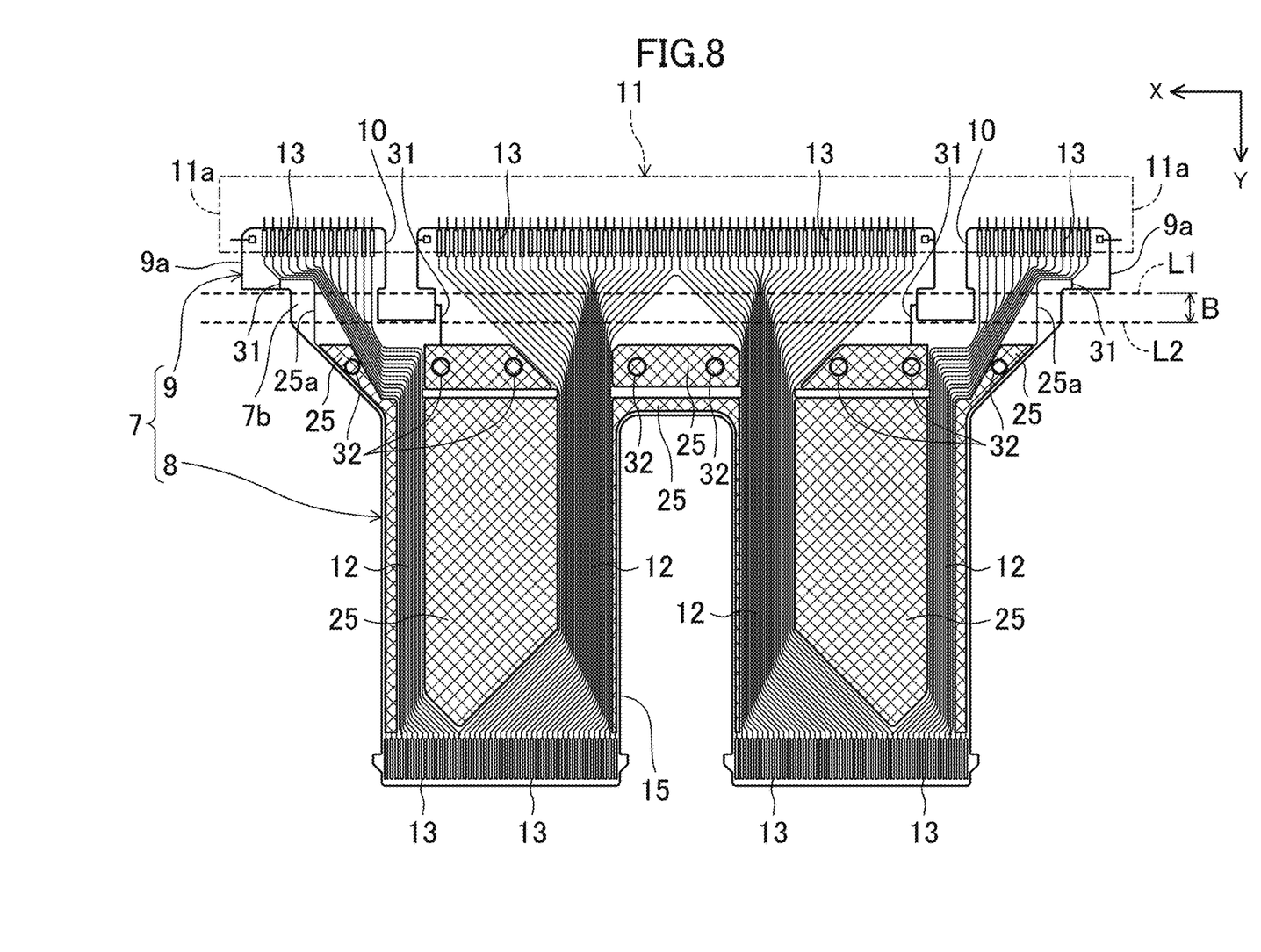
FIG. 8 is a view schematically showing a configuration of a second surface side of a flexible wiring board in the second embodiment.

As shown in FIG. 6 and FIG. 8, a body 8 of the insulating board 7 has a recess 15.

The recess 15 is positioned substantially in the middle of the width direction (X direction) in the body 8. The body 8 is divided into two rectangular-shaped areas in the width direction by the recess 15.

The connection part 9 of the insulating board 7 has two cutouts 10. The connection part 9 is divided into three areas in the width direction (X direction) by the cutouts 10. Each of the cutouts 10 is positioned near the end 11a of the connection area 11. The connection part 9 is fixed to the peripheral edge of the sensor board 5 by, for example, an anisotropic conductive adhesive, as in the first embodiment.

(Signal Line)

As shown in FIG. 8, the plurality of signal lines 12 are on the second surface 7b of the insulating board 7, as in the first embodiment. In this embodiment, the plurality of signal lines 12 are divided into four different paths in the width direction of the body 8.

(Ground Layer)

As shown in FIG. 6 and FIG. 8, the ground layer of the embodiment includes a plurality of third ground layers 23, a fourth ground layer 24, and a plurality of fifth ground layers 25.

Figure 7:
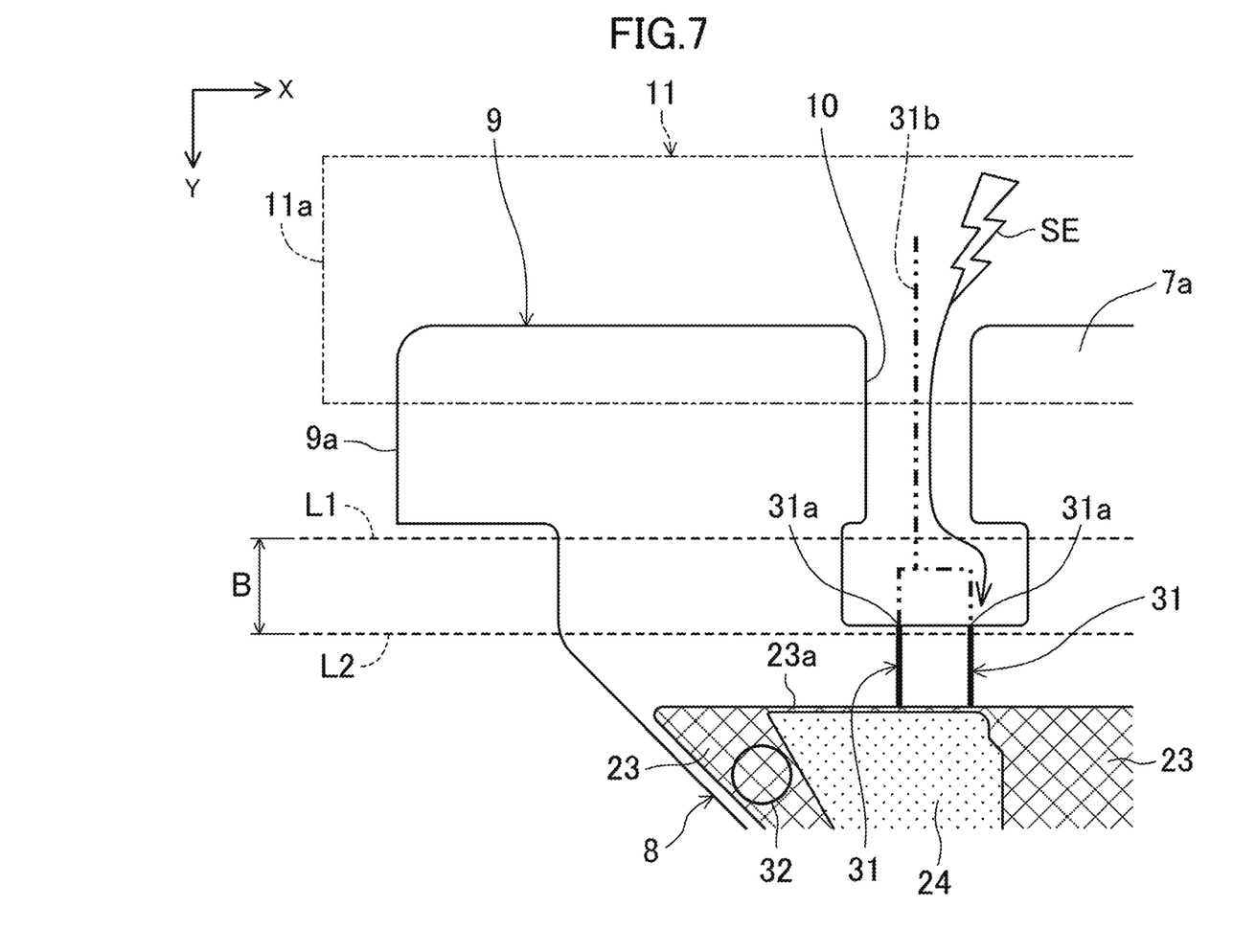
FIG. 7 is a partially enlarged view showing a configuration near a connection area in FIG. 6.

As shown in FIG. 6, the plurality of third ground layers 23 and the fourth ground layer 24 are arranged on the first surface 7a of the insulating board 7. The plurality of third ground layers 23 are arranged so as not to overlap the plurality of signal lines 12 on the second surface 7b across the insulating board 7. On the other hand, the plurality of fourth ground layers 24 are arranged so as to overlap the plurality of signal lines 12 positioned on the second surface 7b across the insulating board 7. As shown in FIG. 7, the plurality of third ground layers 23 are configured to surround the fourth ground layer 24.

The third ground layers 23 and 23 adjacent to each other in the X direction are connected to each other by an outer frame 23a. The outer frame 23a is made of the same electroconductive material as the third ground layers 23. Through the outer frames 23a, all the third ground layers 23 are electrically connected.

As shown in FIG. 8, the plurality of fifth ground layers 25 are arranged on the second surface 7b of the insulating board 7. The plurality of fifth ground layers 25 are arranged in an area of the second surface 7b of the body 8, where the plurality of signal lines 12 are not positioned. That is, each of the fifth ground layers 25 is arranged so as to overlap the third ground layer 23 positioned on the first surface 7a across the insulating board 7. In this embodiment, the plurality of through holes 14 are not shown.

As shown in FIG. 6 and FIG. 8, the third to fifth ground layers 23 to 25 are arranged at positions excluding the connection area 11 between the sensor board 5 and the insulating board 7. Specifically, the third to fifth ground layers 23 to 25 are arranged at positions away from the connection area 11 in the Y direction.

In FIG. 6 to FIG. 9, the broken lines L1 and L2 extend in parallel in the X direction are shown at positions away from the connection area 11 in the Y direction. The broken lines L1 and L2 are positioned between the connection area 11 and the third to fifth ground layers 23 to 25 in the Y direction. The area between the broken lines L1 and L2 in the Y direction is set as an area where the insulating board 7 can be bent inside an external device (not shown) into which the touch sensor 1 is incorporated (hereinafter referred to as "bendable area B"). The third to fifth ground layers 23 to 25 are arranged at positions avoiding the bendable area B.

(First Lightning Arrester)

In this embodiment, a plurality of first lightning arresters 31 are provided on both the first surface 7a and the second surface 7b of the insulating board 7. Each of the first lightning arresters 31 is formed in a linear shape.

As shown in FIG. 6 and FIG. 7, four first lightning arresters 31 are arranged on the first surface 7a of the insulating board 7. The four first lightning arresters 31 are arranged and spaced from one another in the longitudinal direction (X direction) of the connection area 11.

Each of the first lightning arresters 31 positioned on the first surface 7a is arranged near the end 11a of the connection area 11. Specifically, two first lightning arresters 31 are arranged near cutouts 10.

The first lightning arresters 31 on the first surface 7a is arranged with an interval from the connection area 11 in the Y direction. Each of the first lightning arresters 31 positioned on the first surface 7a is configured such that one end 31a is within the bendable area B.

The first lightning arrester 31 positioned on the first surface 7a is integral with the plurality of third ground layers 23. Specifically, each of the first lightning arresters 31 is integral with the outer frame 23a that connects the third ground layers 23, 23 adjacent to each other in the X direction (see FIG. 7). Thus, each of the first lightning arresters 31 positioned on the first surface 7a is electrically connected to the plurality of third ground layers 23.

Each of the first lightning arresters 31 positioned on the first surface 7a extends from the outer frame 23a positioned near the cutout 10 toward the contour end of the insulating board 7 positioned near the connection area 11 (see FIG. 7). The first lightning arresters 31 positioned on the first surface 7a is configured so that one end 31a is positioned at the contour end of the insulating board 7 near the connection area 11 (i.e., position corresponding to the cutout 10).

Figure 9:
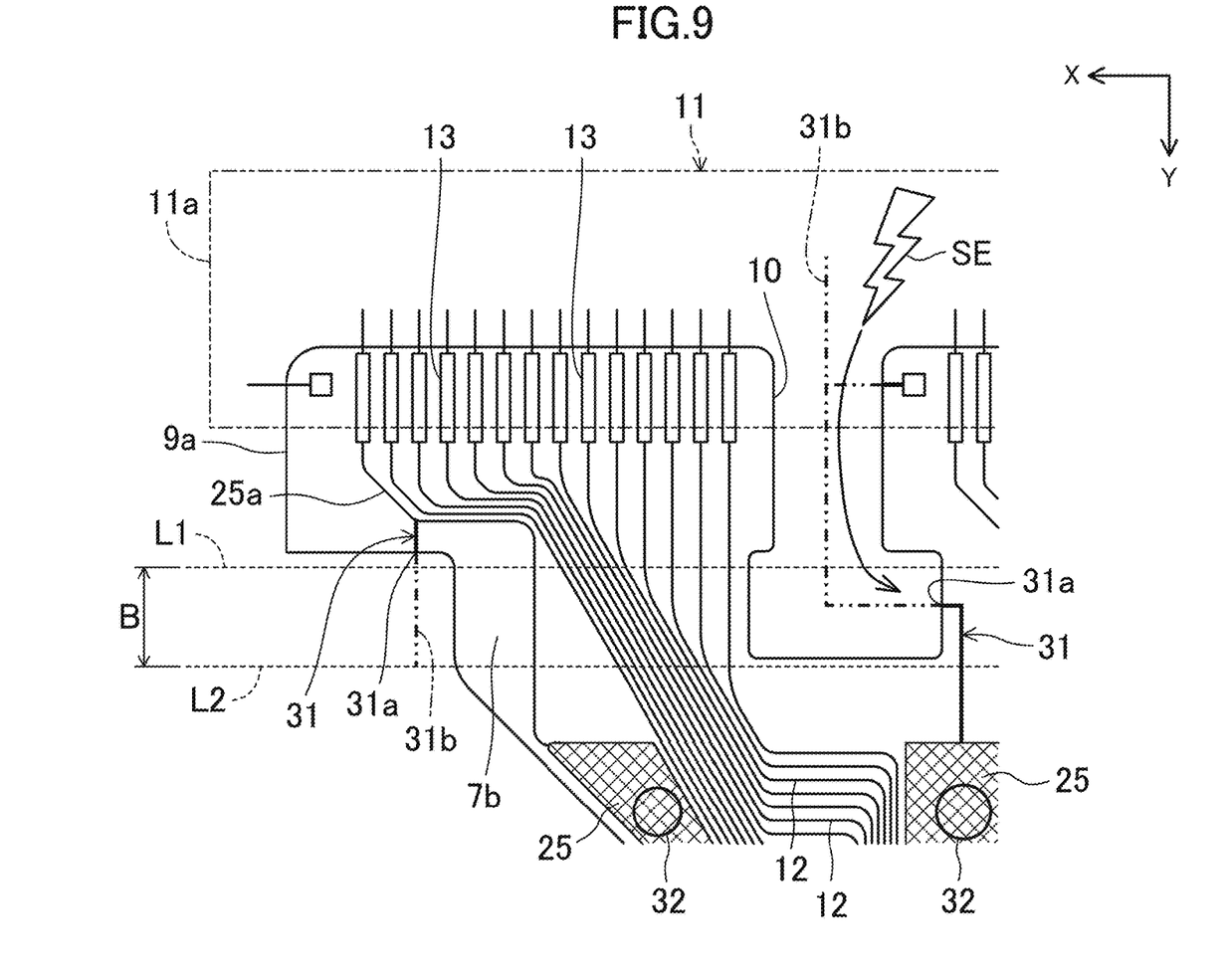
FIG. 9 is a partially enlarged view showing a configuration near a connection area in FIG. 8.

As shown in FIG. 8 and FIG. 9, four first lightning arresters 31 are arranged on the second surface 7b of the insulating board 7. The four first lightning arresters 31 are arranged and spaced from one another in the longitudinal direction (X direction) of the connection area 11. Each of the first lightning arresters 31 positioned on the second surface 7b are arranged so as not to overlap the first lightning arresters 31 positioned on the first surface 7a across the insulating board 7 (see FIGS. 7 and 9).

Each of the first lightning arresters 31 positioned on the second surface 7b is arranged near the end 11a of the connection area 11. Specifically, one first lightning arrester 31 is arranged near each cutout 10. One first lightning arrester 31 is also arranged near each end 9a of the connection part 9.

The first lightning arresters 31 positioned on the second surface 7b are arranged between the connection area 11 and the fifth ground layer 25 in the Y direction. The first lightning arresters 31 positioned near the cutout 10 is configured such that one end 31a is positioned in the bendable area B. The first lightning arresters 31 positioned near the end 9a of the connection part 9 is configured such that one end 31a is positioned near the bendable area B.

The first lightning arrester 31 positioned on the second surface 7b is integral with the fifth ground layer 25. Specifically, the first lightning arrester 31 positioned near the cutout 10 is integral with the fifth ground layer 25. The first lightning arrester 31 positioned near the end 9a of the connection part 9 is integral with a lead 25a that constitute a part of the fifth ground layer 25 (see FIG. 9). Thus, each of the first lightning arresters 31 positioned on the second surface 7b is electrically connected to the fifth ground layer 25.

Each of the first lightning arresters 31 positioned on the second surface 7b extends from the fifth ground layer 25 to the contour end of the insulating board 7 positioned near the connection area 11. Each of the first lightning arresters 31 positioned on the second surface 7b is configured so that one end 31a is positioned at the contour end of the insulating board 7 near the connection area 11.

Here, in FIG. 7 and FIG. 9, the virtual line continuous with each of the first lightning arresters 31 is the excess material 31b of the first lightning arresters 31 removed by machining, as in the first embodiment. Note that the excess material 31b is not shown in FIG. 6 and FIG. 8.

(Second Lightning Arrester)

As shown in FIG. 6 and FIG. 8, the flexible wiring board 6 includes a plurality of second lightning arresters 32. The plurality of second lightning arresters 32 are arranged on the first surface 7a and the second surface 7b of the insulating board 7. A detailed description of the plurality of second lightning arresters 32 is omitted since their configurations are the same as those described in the first embodiment.

Advantageous Effects of Second Embodiment

As described above, also in this embodiment, each of the first lightning arresters 31 is configured so that one end 31a is positioned at the contour end of the insulating board 7 near the connection area 11. This way, the effects of static electricity can be avoided as in the first embodiment.

Particularly, in this embodiment, the ground layers (the third to fifth ground layers 23 to 25) are arranged at positions away from the connection area 11. Each first lightning arrester 31 is arranged between the connection area 11 and the ground layer and is arranged near the bendable area B. Thus, even if the flexible wiring board 6 is bent at the bendable area B inside an external device into which the touch sensor 1 is incorporated, the ground layer is less susceptible to the stress generated on the insulating board 7 by the bending. As a result, damage to the ground layer is avoided. Further, for example, this facilitates the flow of static electricity (see reference character SE illustrated in FIG. 7 and FIG. 9) generated at or near the contour end of the insulating board 7 in the connection area 11 into the end 31a of each first lightning arrester 31 positioned between the connection area 11 and the ground layer. Therefore, malfunctions of the touch sensor 1 and display device caused by static electricity can be avoided. As described, the touch sensor 1 according to the second embodiment can keep the ground layer from being damaged and suppress the effects of static electricity while allowing utilization of the flexibility of the flexible wiring board 6.

Other Embodiments

Each of the above embodiments deals with a case of having a single insulating board 7. The configuration, however, is not limited to this. That is, a plurality of insulating boards 7 may be provided (not shown).

Each of the above embodiments deals with a case where the first lightning arresters 31 are linear. The shape of each first lightning arresters 31, however, is not limited to this. For example, each of the first lightning arresters 31 may have a band shape.

Each of the above embodiments deals with a case of having a plurality of first lightning arresters 31. The configuration, however, is not limited to this. That is, at least one first lightning arrester 31 may be provided on at least one of the first surface 7a and the second surface 7b of the insulating board 7.

Each of the above embodiments deals with a case of having a plurality of second lightning arresters 32. The configuration, however, is not limited to this. That is, there is no particular needs for providing a plurality of second lightning arresters 32, provided that the effects of static electricity can be avoided with at least one first lightning arrester 31.

While the embodiment of the present disclosure has been described above, the present disclosure is not limited thereto and various modifications can be made within the scope of the present disclosure.

INDUSTRIAL APPLICABILITY

The present disclosure is industrially applicable as a touch sensor.

DESCRIPTION OF REFERENCE CHARACTERS

1 Touch Sensor
2 Cover Member
3 Fringe
4 Operation Screen
5 Sensor Board
6 Flexible Wiring Board
7 Insulating Board
7a First Surface
7b Second Surface
8 Body
9 Connection Part
11 Connection Area
12 Signal Line
21 First Ground Layer
22 Second Ground Layer
23 Third Ground Layer
24 Fourth Ground Layer
25 Fifth Ground Layer
31 First Lightning Arrester
31a End
31b Excess Material
32 Second Lightning arrester
B Bendable Area

The invention claimed is:

1. A touch sensor, comprising:
a sensor board; and
a flexible wiring board connected to the sensor board, wherein
the flexible wiring board comprises:
   an insulative and flexible insulating board;
   a ground layer connectable to a ground potential, which is arranged on a first surface of the insulating board, at a position excluding a connection area between the sensor board and the insulating board; and
   a first lightning arrester electrically connected to the ground layer, which is arranged on the first surface of the insulating board, wherein
the first lightning arrester extends from the ground layer toward a contour end of the insulating board, wherein
the first lightning arrester is configured such that one end thereof is positioned at the contour end of the insulating board,
wherein, the flexible wiring board further comprises a second lightning arrester,
the second lightning arrester comprises layers of electro-conductive materials arranged in a part of a surface of the ground layer opposite to the insulating board, and
the second lightning arrester is arranged with an interval from the first lightning arrester, in a longitudinal direction of the connection area.

2. The touch sensor of claim 1, comprising
a plurality of the first lightning arresters, wherein
the plurality of first lightning arresters are arranged and spaced from one another in the longitudinal direction of the connection area.

3. The touch sensor of claim 2, wherein
each of the plurality of first lightning arresters is arranged near an end relative to the longitudinal direction of the connection area.

4. The touch sensor of claim 1, wherein
the first lightning arrester is arranged closer to an end relative to the longitudinal direction of the connection area as compared to the second lightning arrester.

5. The touch sensor of claim 1, wherein
the ground layer is separated away from the connection area,
the insulating board can be bent in a bendable area between the connection area and the ground layer, and
the first lightning arrester is arranged between the connection area and the ground layer.

* * * * *